UNITED STATES PATENT OFFICE.

CARL BEINDL, OF MUNICH, GERMANY.

METHOD OF PRODUCING CYANOGEN COMPOUNDS.

1,144,457. Specification of Letters Patent. Patented June 29, 1915.

No Drawing. Application filed September 1, 1910. Serial No. 579,994.

*To all whom it may concern:*

Be it known that I, Dr. CARL BEINDL, a subject of the German Emperor, and resident of Munich, Germany, have invented certain new and useful Improvements in Methods of Producing Cyanogen Compounds, of which the following is a specification.

My invention relates to certain improvements in the production of hydrocyanic acid and cyanic compounds by the so-called contact method, or catalysis.

The invention refers more especially to the composition of the chemical compounds to be treated and the character of the catalytic agent with which these compounds are caused to contact.

In carrying the invention into practice I form a gas mixture of volatilized or gaseous nitrogenous compounds with carbon compounds, and conduct this mixture into contact with a heated catalytic agent, which is preferably in the form of a wire net of suitable material. To produce commercially satisfactory results, it is essential that the compounds be pure or substantially so, and that the mixture contain no more than ten parts, by volume, of the carbon compounds to each part, by volume, of the nitrogenous compounds.

It will be understood that various kinds of gas may be used to form the mixture above referred to, but humid gases should preferably not be employed. The mixture may be effected in a suitable gasometer, into which the gases are fed by pressure and suction pumps. If, for example, a mixture of ammonia and acetylene is to be treated, it is advisable to place adjacent the acetylene generator a gas scrubber and an ammonia generator. The mixture may, however, be effected directly in the gas generator itself, in which case concentrated ammonia is caused to act directly on the calcium carbid used for generating the acetylene. I have found that I obtain the best results by conducting a mixture consisting of 34 parts by weight of ammonia and 13 parts by weight of acetylene, into contact with the catalytic agent.

The catalytic agent, which as above stated is preferably in the form of a wire net, may consist of gold, silver, iridium, palladium, rhodium, copper, manganese, cobalt, chromium, iron, or the nitrids thereof. I may also construct the catalytic agent of metal alloy, such as copper and zinc or the like.

The temperature to which the catalytic agent is heated to produce the desired results, depends upon the nature of the catalytic agent itself, the nature of the gases subjected to treatment and the velocity of the gas as it contacts with the catalytic agent. If a mixture of acetylene and ammonia is brought into contact with a copper catalytic agent, cyanogen is formed at a temperature of 480° centigrade.

After the gases have passed the catalytic agent they are cooled and conducted into an absorption apparatus preferably supplied with caustic lye, after which treatment the gases may be again used.

The cyanic compounds are obtained, by means well known in the art, from cyanate of ammonia and cyanate of potassium, respectively.

I am aware that it has been heretofore proposed to subject a mixture of nitrogenous compounds and carbon compounds to the action of a catalytic agent and I lay no claim to this process, but

What I claim and desire to secure by Letters Patent is:—

The herein described process of producing hydrocyanic acid and cyanic compounds, which process consists in forming a mixture of no more than ten parts by volume of substantially pure carbon compound and one part by volume of substantially pure nitrogenous compound, and conducting said mixture into contact with a catalytic agent of wire-net incapable of decomposing the nitrogenous compounds in said mixture and heated to a temperature not exceeding 500° C.

In testimony whereof I have hereunto set my hand in the presence of two subscribing witnesses.

Dr. CARL BEINDL

Witnesses:
A. V. W. COTTER,
MATHILDE K. HELD.